United States Patent
Zalewski et al.

(10) Patent No.: US 8,663,770 B2
(45) Date of Patent: Mar. 4, 2014

(54) BONDED AND STITCHED COMPOSITE STRUCTURE

(75) Inventors: Bart F. Zalewski, Broadview Heights, OH (US); William B. Dial, Cuyahoga Falls, OH (US)

(73) Assignee: Zin Technologies, Inc., Middleburg Heights, OH (US)

( * ) Notice: Subject to any disclaimer, the term of this patent is extended or adjusted under 35 U.S.C. 154(b) by 117 days.

(21) Appl. No.: 13/458,627

(22) Filed: Apr. 27, 2012

(65) Prior Publication Data

US 2012/0276320 A1     Nov. 1, 2012

Related U.S. Application Data

(60) Provisional application No. 61/480,251, filed on Apr. 28, 2011.

(51) Int. Cl.
*B32B 3/10*     (2006.01)

(52) U.S. Cl.
USPC .......... 428/61; 156/93; 156/304.2; 156/304.3

(58) Field of Classification Search
USPC .......... 428/61; 156/93, 304.2, 304.3; 244/131
See application file for complete search history.

(56) References Cited

U.S. PATENT DOCUMENTS

| | | | |
|---|---|---|---|
| 3,405,019 A | 10/1968 | Seil et al. | |
| 3,455,258 A | 7/1969 | Noboru | |
| 3,483,020 A | 12/1969 | Giellerup | |
| 3,700,387 A | 10/1972 | Moore | |
| 4,091,157 A | 5/1978 | Hori et al. | |
| 4,256,790 A | 3/1981 | Lackman et al. | |
| 4,299,871 A | 11/1981 | Forsch | |
| 4,440,532 A | 4/1984 | D'Apuzzo | |
| 4,445,951 A | 5/1984 | Lind et al. | |
| 4,460,634 A | 7/1984 | Hasagawa | |
| 4,496,412 A | 1/1985 | Ritter | |
| 4,503,788 A | 3/1985 | Giannuzzi | |
| 4,681,651 A | 7/1987 | Brozovic et al. | |
| 4,708,761 A | 11/1987 | Taniguchi et al. | |
| 4,732,639 A | 3/1988 | Newsom | |
| 4,788,413 A | 11/1988 | Eng | |
| 4,789,770 A | 12/1988 | Kasner et al. | |
| 5,096,342 A | 3/1992 | Blankenship et al. | |

(Continued)

FOREIGN PATENT DOCUMENTS

JP     11/036456 A     2/1999
KR     10-2009-0029167 A     3/2009

OTHER PUBLICATIONS

Thurm, T., "Application areas of One-Side Stitching Technique", Technische Textilien, May 2004.

(Continued)

*Primary Examiner* — Alexander Thomas
(74) *Attorney, Agent, or Firm* — Tarolli, Sundheim, Covell & Tummino LLP (57) ABSTRACT

A method of forming a composite structure can include providing a plurality of composite panels of material, each composite panel having a plurality of holes extending through the panel. An adhesive layer is applied to each composite panel and a adjoining layer is applied over the adhesive layer. The method also includes stitching the composite panels, adhesive layer, and adjoining layer together by passing a length of a flexible connecting element into the plurality of holes in the composite panels of material. At least the adhesive layer is cured to bond the composite panels together and thereby form the composite structure.

22 Claims, 5 Drawing Sheets

(56) References Cited

U.S. PATENT DOCUMENTS

| | | | |
|---|---|---|---|
| 5,313,902 | A | 5/1994 | Shoji |
| 5,397,415 | A | 3/1995 | Manabe et al. |
| 5,480,508 | A | 1/1996 | Manabe et al. |
| 5,515,798 | A | 5/1996 | Cahuzac |
| 5,585,178 | A | 12/1996 | Calhoun et al. |
| 5,589,122 | A | 12/1996 | Leonard et al. |
| 5,829,373 | A | 11/1998 | Baxter |
| 5,877,498 | A | 3/1999 | Sugimoto et al. |
| 5,879,794 | A | 3/1999 | Korleski |
| 5,960,104 | A | 9/1999 | Conners et al. |
| 6,106,646 | A | 8/2000 | Fairbanks |
| 6,196,908 | B1 | 3/2001 | Adams |
| 6,391,436 | B1 | 5/2002 | Xu et al. |
| 6,713,719 | B1 | 3/2004 | DeSteur et al. |
| 6,841,615 | B2 | 1/2005 | Andersson et al. |
| 7,013,943 | B2 | 3/2006 | Sana et al. |
| 7,255,761 | B2 | 8/2007 | Zafiroglu |
| 7,575,401 | B1 | 8/2009 | Garrick et al. |
| 7,665,935 | B1 | 2/2010 | Garrick et al. |
| 2002/0180238 | A1 | 12/2002 | Sill |
| 2009/0278371 | A1 | 11/2009 | Fuchs et al. |

OTHER PUBLICATIONS

Tong, L., Mouritz, A. P. and Bannister, M. K., "3D Fibre Reinforced Polymer Composites", Elsevier, Dec. 1, 2002.

Mouritz, A. P., Cox, B. N., "A Mechanistic Approach to the Properties of Stitched Laminates", Composites Part A, 31A, pp. 1-27, Jul. 8, 1999.

Tong, L., Jain, L. K., "Analysis of Adhesive Bonded Composite Lap Joints with Transverse Stitching", Applied Composite Materials, 2, pp. 343-365, Jan. 19, 1996.

Aymerich, F., Onnis, R., Priolo, P., "Analysis of the Effect of Stitching on the Fatigue Strength of Single-Lap Composite Joints", Composites Science and Technology, 66, pp. 166-175, Jun. 15, 2005.

Xiaoquan, C., Al-Mansour, A. M., Zhengneng, L., and Chenghe, K., "Compression Strength of Stitched Laminates after Low-Velocity Impact", Journal of Reinforced Plastics and Composites, 24(9), pp. 935-947, Sep. 2005.

Larsson, F., "Damage Tolerance of a Stitched Carbon/Epoxy Laminate", Composites Part A, 28A, pp. 923-934, May 22, 1997.

Reeder, J. R. and Glaessgen, E. H., "Debonding of Stitched Composite Joints Under Static and Fatigue Loading", Journal of Reinforced Plastics and Composites, 23(3), pp. 249-263, Mar. 2004.

Adams, L., "Efficient Method for Unsupported Drilling of Composites", Proceedings of the 41st International SAMPE Symposium, pp. 1496-1502, Mar. 1996.

Tong, L., Jain, L. K., Leong, K. H., Kelly, D., and Herszberg, I., "Failure of Transversely Stitched RTM Lap Joints", Composite Science and Technology, 58, pp. 221-227, Jul. 3, 1997.

Mouritz, A. P., "Flexural Properties of Stitched GRP Laminates", Composites Part A, 27A, pp. 525-530, Jan. 2, 1996.

Wittig, J., "Recent Development in the Robotic Stitching Technology for Textile Structural Composites", Journal of Textile and Apparel, Technology and Management, 2(1), pp. 1-8, May 2001.

Int'l Search Report—3 pgs., Nov. 12, 2012, Zin Technologies, Inc.

Written Opinion—5 pgs., Nov. 12, 2012, Zin Technologies, Inc.

BONDED AND STITCHED COMPOSITE STRUCTURE

CROSS-REFERENCE TO RELATED APPLICATION

This application claims the benefit of U.S. Provisional Patent Application No. 61/480,251, filed Apr. 28, 2011 and entitled BONDED AND STITCHED COMPOSITE STRUCTURE, which is incorporated herein in its entirety.

GOVERNMENT FUNDING

This invention was made with government support under contract number NNC09BA02B from NASA Glenn Research Center. The United States government may have certain rights to the invention.

TECHNICAL FIELD

This disclosure relates to a composite structure and, in particular, relates to a composite structure formed of panels that are stitched and may be bonded together.

BACKGROUND

Techniques for securing composite panels of material together are known in the art. Currently, bonded joints have an unverifiable reliability associated with them since there are no means to assess the quality of the bond in a nondestructive manner. The current limitations of bonded joints occur due to their lack of redundancy. These joints can fail catastrophically upon progressive bond failure. Bolted joints, whose quality can be quantitatively measured without testing the joint, are not mass efficient and are labor intensive. Bolted joints are also heavy compared to bonded joints and therefore tend not transfer load efficiently.

SUMMARY

This disclosure relates to a composite structure and, in particular, relates to a composite structure formed of panels that are stitched and may be bonded together.

As one example, a method of forming a composite structure can include providing a plurality of composite panels of material, each composite panel having a plurality of holes extending through the panel. An adhesive layer is applied to each composite panel and an adjoining layer (e.g., a prepreg layer or rigid plate) is applied over the adhesive layer and the joint between the composite panels. The method also includes stitching the composite panels, adhesive layer, and adjoining layer together by passing a length of a flexible connecting element into the plurality of holes in the composite panels of material. At last the adhesive layer is cured to bond the composite panels together and thereby form the composite structure.

As another example, a composite structure can include a pair of composite panels of material, each of the composite panels having a plurality of holes extending therethrough adjacent at least one end portion thereof, the end portion of each of the composite panels being positioned adjacent to each other to define a joint therebetween. A layer of adhesive material can be disposed on a surface of each of the composite panels overlying the holes. An adjoining layer can be disposed over the layer of adhesive material on each of the composite panels, the layer of adhesive material being cured to bond the composite panels of material together. A length of a flexible connecting element (e.g., a thread) can extend through the adjoining layer and the layer of adhesive material and into the holes of the composite panels to stitch the pair of composite panels a together to provide the composite structure—providing a redundant connection at the joint.

DETAILED DESCRIPTION

This disclosure relates to a composite structure formed of cured composite panels that are stitched and may be bonded together. This disclosure also discloses a method to make such composite structure. As disclosed herein, the composite structure allows for increased damage tolerance and redundancy of a composite joint (by plural connections at the joint) and provides a highly efficient approach to join two adjacent panels. Such a composite structure can be used for example, to join panels of materials for aircraft (e.g., rockets, such as heavy lift launch vehicles) as well as other vehicles and mechanism that are expected to experience increased loads at joints during use.

Figure 1:
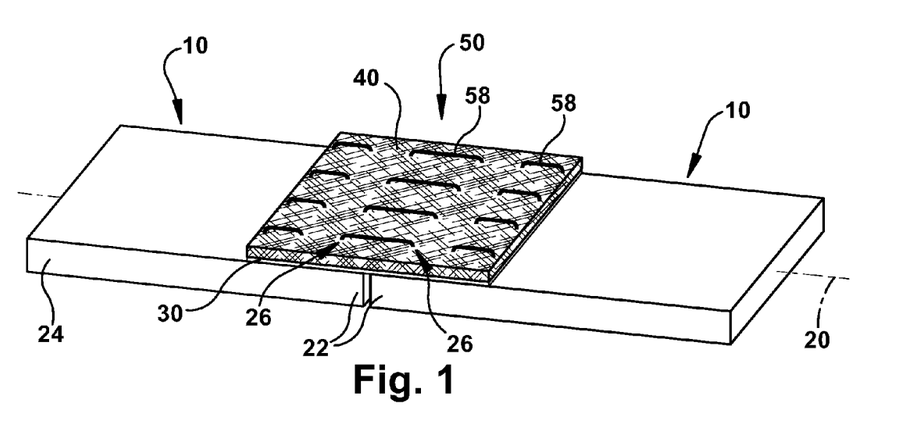
FIG. 1 depicts a schematic illustration of a composite structure in accordance with an example embodiment.
Figure 2:
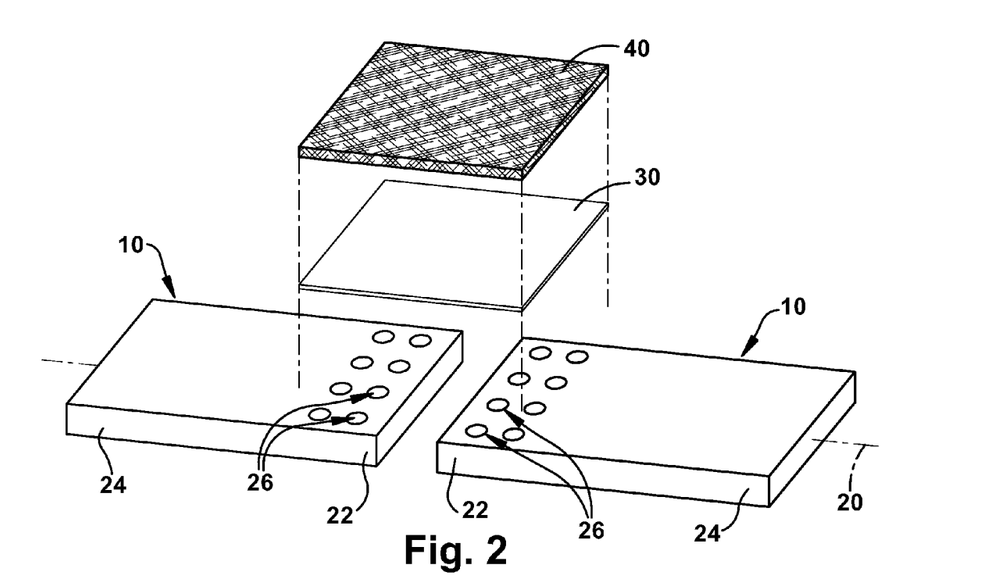
FIG. 2 is an exploded view of the composite structure of FIG. 1.

An example of a composite structure 50 is illustrated in FIGS. 1-2. The composite structure 50 includes two or more composite panels 10, an adhesive layer 30 and an adjoining layer 40. Stitching 58 mechanically connects the composite panels, adhesive layer, and adjoining layer together to provide the composite structure 50.

In the example of FIG. 1, each composite panel 10 has a generally rectangular shape, although other shapes such as triangular, square, circular, etc. may alternatively be used in other examples. Additionally, while the composite panel 10 is demonstrated in the example of FIG. 1 as a substantially flat sheet of material, each composite panel 10 being joined may have other configurations, such as can be curved or cylindrical.

In the example of FIG. 1, each composite panel 10 extends along an axis 20 from a first end 22 to a second end 24. The composite panels 10 are manufactured and cured prior to assembling the composite structure 50. Each composite panel 10 may have several different architectures.

Figure 3:
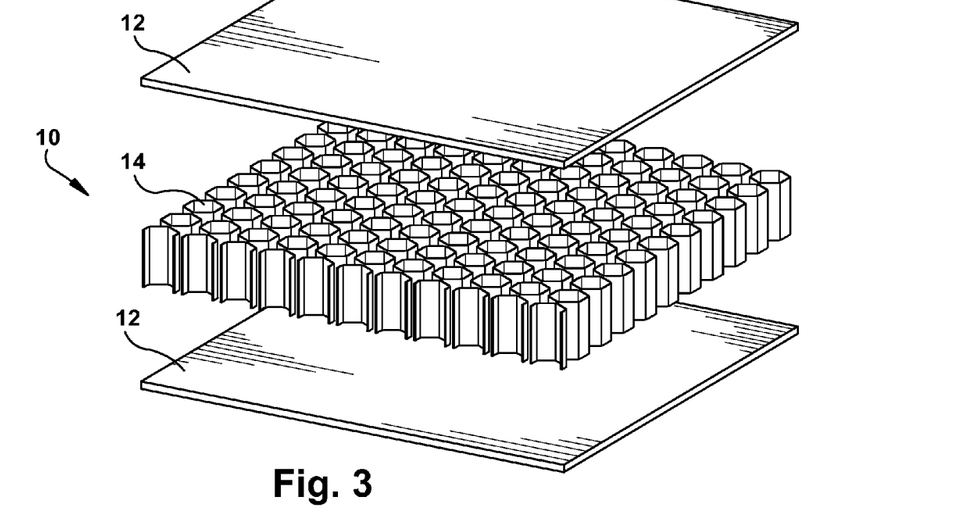
FIG. 3 is an exploded view of an example composite panel that can be used to form the composite structure of FIG. 1.

Referring to FIG. 3, the composite panel 10 can be formed as a honeycomb sandwich. For example, the honeycomb sandwich for such composite panel 10 can be formed of a honeycomb core that is bonded between a pair of composite facesheets 12. The honeycomb core 14 can be formed of a metal, e.g., aluminum or an alloy thereof. Alternatively, the composite panel 10 may constitute fiber reinforced foam 14*a*

Figure 4A:
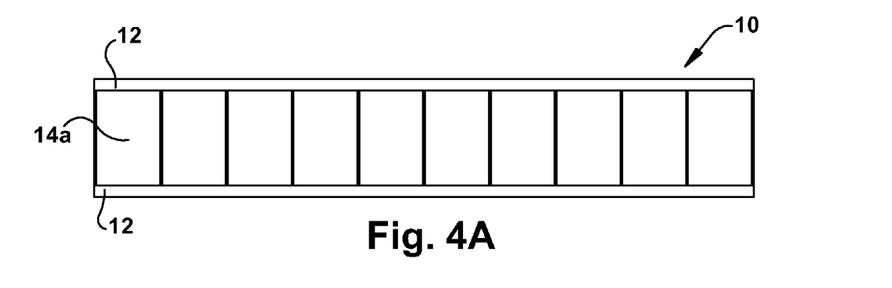
FIGS. 4A-4B depict schematic illustrations of alternative composite panel configurations that can be implemented.

(e.g., the TYCOR products available from WebCore Technologies, LLC), such as can be formed by wrapping foam with dry fibers on a helix and then putting dry fiber facesheets 12 on both sides such as shown in FIG. 4a. The entire assembly can be infused with resin with a vacuum pull and heated to cure the composite structure.

Figure 4B:
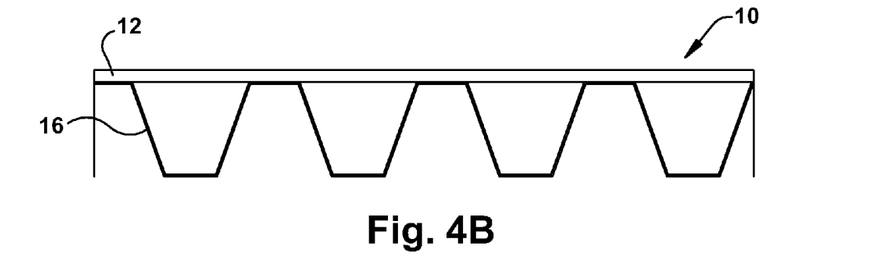

As another example, the composite panel 10 may be formed as a facesheet 12 that is reinforced with corresponding stiffeners 16 such as shown in FIG. 4B. For instance, the stiffeners 16 can have various shapes, such as I-shaped, Z-shaped or flat top hat-shaped stiffeners. In any case, the panels 10 used to form the composite structure 50 may have the same construction as one another and may be formed of the same material. Alternatively, the panels 10 may have different architectures and/or be formed from different materials. Producing the panels 10 from the same material helps reduce the affects of thermal stresses upon the panels during assembly of the cured composite structure 50.

Referring to the exploded view of FIG. 2, the composite structure 50 can include holes 26 formed in each of the composite panels 10 in a predetermined pattern adjacent the first end 22 thereof. The pattern may depend on the geometry of the composite panels and/or any force requirements of the stitching to be performed. As shown in the example of FIG. 1, two rows of holes 26 are formed in each composite panel 10. It will be appreciated, however, that more or fewer holes 26 may be formed in each composite panel 10 in a symmetric or asymmetric pattern in other embodiments. The holes 26 are sized and arranged to receive a stitching needle and thread in order to mechanically secure the composite panels 10 together without damaging the stitching needle. The holes 26 may be formed using various techniques such as, for example, a typical composite drilling operation or laser drilling. The holes 26 may have any shape, e.g., circular, and should be clean enough to minimize localized damage to the material of the composite panel 10 defining the holes.

Examples of hole-forming techniques that can be utilized are disclosed in U.S. Pat. No. 4,440,532 to D'Apuzzo, U.S. Pat. No. 4,789,770 to Kasner, U.S. Pat. No. 5,096,342 to Blankenship, U.S. Pat. No. 6,196,908 to Adams, U.S. Pat. No. 6,713,719 to De Steur, U.S. Pat. No. 7,575,401 to Garrick, and U.S. Pat. No. 7,665,935 to Garrick, the entirety of which are incorporated by reference herein in their entirety.

Figure 5:
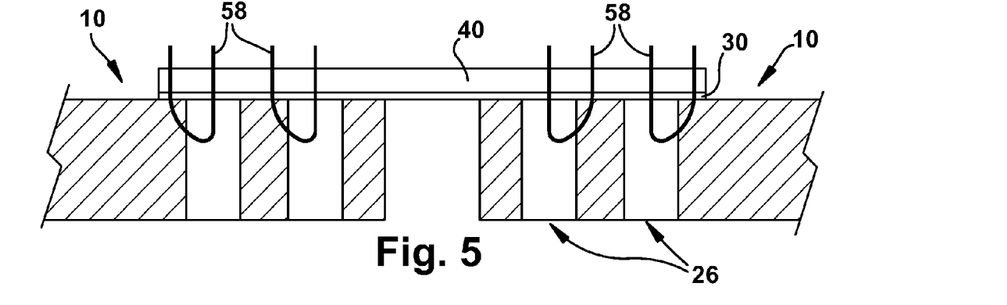
FIG. 5 is a partial cross-section of the composite structure of FIG. 1.

The composite panels 10 on which the adhesive layer 30 and adjoining layer 40 are provided are aligned in a predetermined configuration such that they can be joined to form the cured composite structure 50. For example, the composite panels 10 may be arranged to form a longitudinal or lap joint as shown in the examples of FIG. 1 and FIG. 5, which can extend along substantially the entire length of the adjacent edges of the respective panels being joined. In this example lap joint, the composite panels 10 are oriented in a co-planar manner such that the first end 22 of each panel in which the holes 26 are formed is placed adjacent to one another (e.g., in an end-to-end abutting arrangement) in which the ends may or may not engage each other. In other examples, the lengths of the adjacent edges at such joints may be different.

Figure 6:
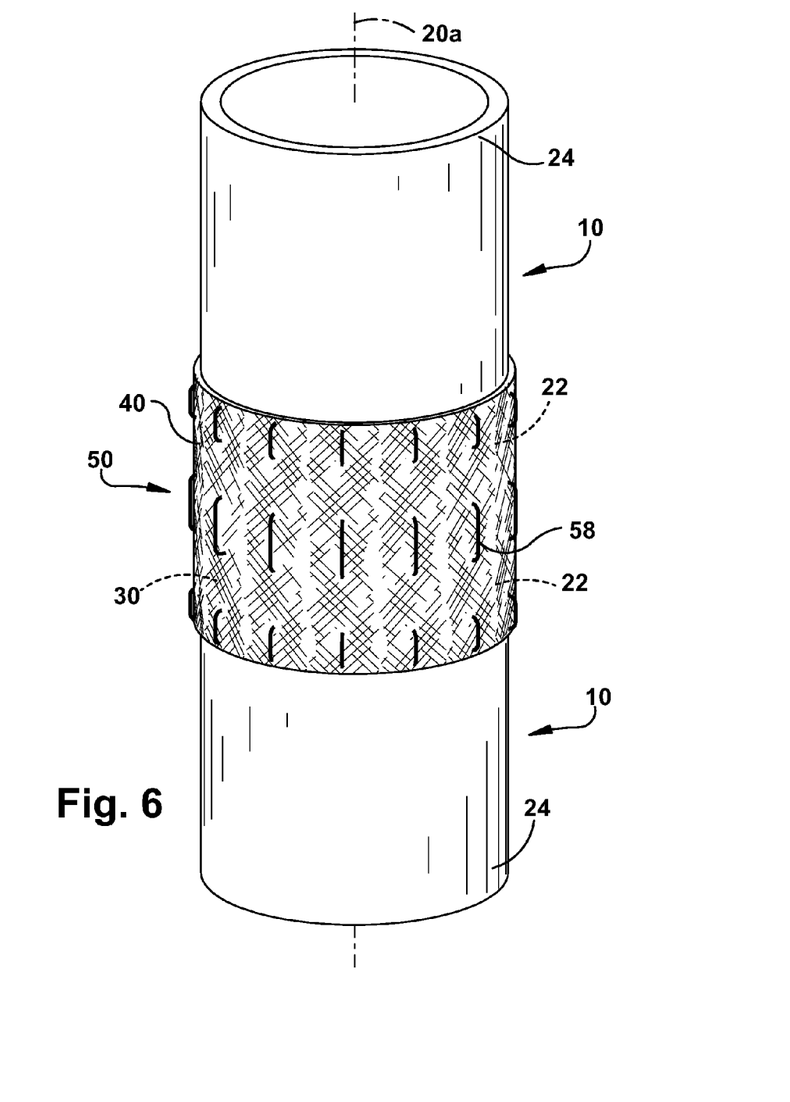
FIG. 6 depicts a schematic illustration of a composite structure having a circumferential joint.

As another example, each composite panel 10 may be formed into or otherwise be made to have a curved shape at the end portion having the holes 26. FIG. 6 demonstrates an example where the composite panels being joined have a tubular shape. Thus, in this example, each of the first ends in this arrangement can have about the same size and curved shape (e.g., circular). The first ends 22 can spaced apart from opposed ends 24 of each panel 10. The first ends 22 can be positioned together be along an axis 20a (e.g., panels 10 can be coaxially arranged) such that a circumferential joint is formed between the first ends 22 of the composite panels. In either example, as disclosed herein, the composite panels 10 may abut one another or may be spaced apart from one another. The particular joint design can be made to provide for enhanced load sharing between the composite panels 10 upon forming the composite structure 50.

A tool, e.g., a roller or spray mechanism (not shown), then applies an adhesive layer 30 over portions of each panel 10, such that the adhesive layer extends over to cover portions of both composite panels. In one example, the adhesive layer 30 is laid down only in the area of the holes 26 of each composite panel 10, although the adhesive layer may alternatively be applied over more portions of each panel or the entirety of each panel. The adhesive layer 30 can be accurately laid upon the composite panels 10 in the area of the holes 26 in the composite panels 10 (e.g., by automated devices) since the layout of the holes in each panel is known or can be ascertained easily. Additional adhesive 30 may be provided in one or more of the holes 26 in the composite panels 10 (not shown).

As a further example, the area enclosing each hole 26 in the composite panel 10 should be smaller or equal to the area of the adhesive layer 30 laid upon the composite panel. The adhesive layer 30 may be provided on a carrier sheet (e.g., backing paper) that includes an activatable adhesive agent that may be cured in response to a stimulus (e.g., heat and/or pressure). A single sheet that includes the adhesive layer 30 can be applied to cover the holes 26 and the joint between both panels 10. Alternatively, separate sheets of the adhesive layer 30 can be applied to the surface of each of the panels 10 overlying the holes 26. The adhesive layer 30 can have a coefficient of thermal expansion that is similar to that of the composite panel 10 to which it is applied to mitigate thermal stresses during subsequent curing of the adhesive and other temperature fluctuations.

Examples of constructions for the adhesive layer 30 that can be utilized are disclosed in U.S. Pat. No. 3,483,020 to Giellerup, U.S. Pat. No. 4,091,157 to Hori, U.S. Pat. No. 4,460,634 to Hasegawa, U.S. Pat. No. 5,585,178 to Calhoun, U.S. Pat. No. 5,589,122 to Leonard, U.S. Pat. No. 5,879,794 to Korleski, and U.S. Pat. No. 6,841,615 to Andersson, the entirety of which are incorporated by reference herein in their entirety.

The adjoining layer 40 may constitute a prepreg layer that includes pre-impregnated composite fibers such as a unidirectional tape or woven cloth. The prepreg adjoining layer 40 may contain an amount of a matrix material used to bond the fibers together and to other components. The prepreg adjoining layer 40 is disposed on top of the adhesive layer 30 such as via a tool, e.g., a roller. The area of the prepreg adjoining layer 40 may be equal or unequal to the area of the laid adhesive layer 30. The prepreg adjoining layer 40 can be accurately laid upon the composite panels 10 and over the joint since the layout of the holes 26 in the panels is known. The adjoining prepreg layer 40 may be disposed on bonding or backing paper and may include a fabric layer impregnated or partially-impregnated with a resin composition by applying heat and pressure.

Examples of constructions that can be implemented for the prepreg adjoining layer 40 are disclosed in U.S. Pat. No. 4,708,761 to Taniguchi, U.S. Pat. No. 5,397,415 to Manabe, U.S. Pat. No. 5,480,508 to Manabe, U.S. Pat. No. 6,391,436 to Xu, and U.S. Pat. No. 7,013,943 to Sana, the entirety of which are incorporated by reference herein in their entirety.

As another example, the adjoining layer 40 can be implemented as a rigid plate that is applied over the adhesive layer 30 and over the joint between the composite panels 10. The rigid plate adjoining layer 40 can be as a cured hard plate that includes holes sized and positioned to match the holes 26 through the composite panels being joined. For example, the rigid plate adjoining layer 40 can be implemented with the same materials used in the composite panels 10, such as the facesheets 12 (see FIGS. 4A-4B) as disclosed herein, which would mitigate loading due to differences in coefficients of thermal expansion that might exist with different materials. Thus, in contrast to the prepreg adjoining layer example mentioned above, the hard cured plate adjoining layer would not have to be cured after stitching, such that the manufacturing process of the structure may be facilitated. Additionally, the hard cured plate could also be initially fabricated in a much larger size than needed and cut to size according to application requirements.

For the example of using the prepreg adjoining layer 40, prepreg stiffeners 42, such as I, T, or L-shaped stiffeners, can be adhered to or otherwise secured to the prepreg adjoining layer 40. The prepreg stiffeners can be formed within each sheet of the prepreg layer as well as extend between opposed prepreg layers at each surface of the composite panel as demonstrated in the example of FIG. 7. The prepreg stiffeners 42 thus can be utilized to increase the stiffness of the resulting composite structure 50. The stiffeners 42 may be formed of a resilient material (e.g., an inelastically deformable plastic material), that allows passage of a stitching needle therethrough similar to the stiffeners in the composite panels of FIGS. 4A and 4B.

The adjoining layer 40 can have a coefficient of thermal expansion that is similar to that of the adhesive layer 30 and the composite panel 10 on which it is laid in order to mitigate thermal stresses during subsequent manufacturing steps and during subsequent use.

To stitch the components 10, 30, 40 together, a stitching needle (not shown) can be prepared to include a flexible connecting element 58 through an eye of the needle. The needle can be part of a sewing machine, which can be used to pass the connecting element 58 through the adjoining layer 40 (e.g., a prepreg layer or an already cured plate that includes holes), the prepreg stiffeners 42 (if present), the adhesive layer 30, and into the holes 26 in the composite panels 10. This can be implemented via an industrial type sewing machine, for example.

To help increase strength of the resulting structure 50, the thread can be pretensioned (e.g., by the sewing machine) between each stitch or every couple of stitches. As needle is pulled out of the composite hole, the machine can apply predetermined force to the thread 58. The amount of tension applied to the thread 58 for each stitch can depend on the elasticity of the thread and the coefficient of thermal expansion of the thread compared to the composite panels 10 being joined. The pretensioning of the stitches also helps facilitate load sharing between the adhesive layer 30 and the thread 58 in the composite structure. For instance, a continuous stitch can be applied to the components 10, 30, and 40 at each side of the joint being formed of the structure 50. In other examples, multiple threads can be utilized at each side, such that each stitch or multiple stitches are formed of a single length of the thread 58.

As an example, the thread 58 can be implemented as a flexible connecting element, such as yarn, fully oriented filament yarn, flat filament yarn, staple-based yarn, bulked twisted filament yarn, hard or flat or textured filament yarn, textured polymeric yarn or composite flat/textured polymeric yarn. Any yarn or other flexible element can be used so long as it does not gather or buckle the adhesive layer 30. In some examples, the thread 58 can be selected to have a coefficient of thermal expansion that substantially matches the hard material components (e.g., the composite panel 10) being joined.

In accordance with one example embodiment, neither the adhesive layer 30 nor the adjoining layer 40 is cured prior to stitching and, thus, the layers and the composite panels can be penetrated by the needle in a traditional matter without damaging the needle. When the stiffeners 42 are present, the needle can pass through flange portions 44 of each stiffener (see FIG. 7) to add rigidity to the composite structure 50. After the stitching has been applied to secure the structure, the adhesive layer 30, the adjoining layer 40 and the thread 58 can be cured as disclosed herein.

In the example of a hard plate adjoining layer 40, the adjoining layer can be cured prior to being applied over the adhesive layer 30 to cover the joint between the composite panels 10. Holes through the plate adjoining layer 40 can be preformed (e.g., via drilling) such as at the same size and locations as the holes formed through the composite panels 10. After stitching the layers 10, 30 and 40 together the adhesive can be cured to bond the composite structure 50 together.

Figure 7:
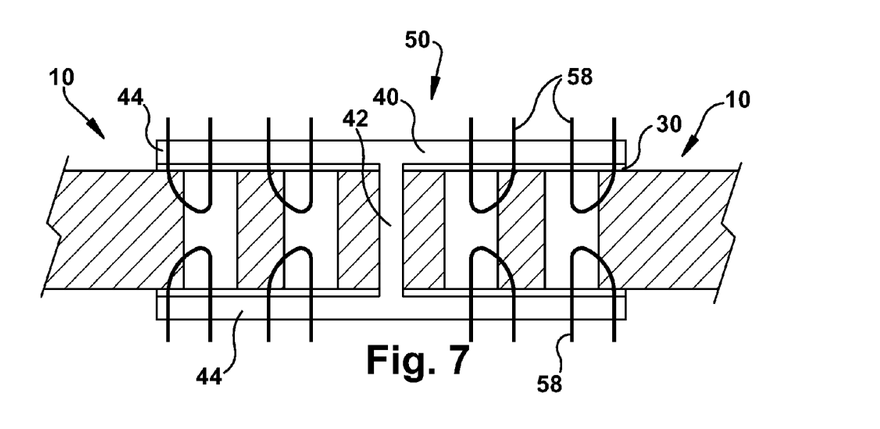
FIG. 7 is a partial cross-section of a composite structure that includes prepreg stiffeners.

The stitches of thread 58 may be formed in any predetermined pattern using various known or yet-to-be developed stitching techniques. For example, the thread 58 may pass all the way through the holes 26 or—as shown in the examples of FIGS. 5 and 7—the thread may pass partially through the holes but not extend entirely through each composite panel 10. Various other stitching designs can be utilized depending on the construction or configuration of the composite panel 10 as well as the expected forces to which the stitching joints will be subjected. For example, both single sided stitching techniques and double sided stitching techniques (not shown) are contemplated by the present disclosure. In any case, stitching the composite panels 10 together using thread 58 and adhesive layer 30 forms a durable mechanical joint between the composite panels.

Regardless of the stitching configuration used, following stitching of the composite panels 10 together, the mechanically joined panels can be locally cured using a curing process in order to form a bonded or adhesive joint between the composite panels in the composite structure 50. For example, localized heaters and vacuum bags may be used to cure the adhesive layer 30 to form the bonded joint between the composite panels 10. Initially, the cured adhesive joint will be a regular bonded joint with a surface area equal to the surface area of the adhesive layer 30 minus the surface area of the holes 26 in the composite panels 10. However, when any portion of the cured adhesive layer 30 fails, the bonded joint will transfer the load through the thread 58 stitches, i.e., to the mechanical joint, and therefore provide fastening redundancy between the composite panels 10 in the composite structure 50. In the case which the stitch is pretensioned, the initial joint will exhibit load sharing between the flexible connecting element 58 and the adhesive.

Examples of curing methods that can be utilized to cure the materials at the bonded joint can include those disclosed in U.S. Pat. No. 4,788,413 to Eng, U.S. Pat. No. 4,496,412 to Ritter, U.S. Pat. No. 4,732,639 to Newsom, each of which are incorporated herein by reference in their entirety.

Figure 8:
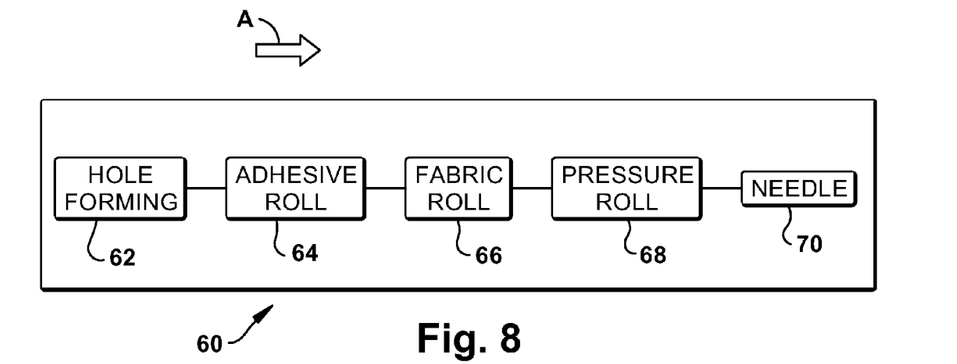
FIG. 8 is a schematic illustration of a multi-headed tool that can be used to form the composite structure of FIG. 1.

FIG. 8 depicts a schematic example of a multi-headed tool 60 that can be utilized to fabricate a composite structure 50. For example, the tool 60 a single, multi-headed tool 60 can be configured to perform each of the joining operations to form the composite structure 50 as to increase operational efficiency of the manufacturing and assembly process. As shown in FIG. 8, the multi-headed tool 60 may include means for forming the holes 26, such as a drill, in the composite panels 10 to be joined. An adhesive roll 64 can be used to apply the adhesive layer 30 to the composite panels, such as in overlying relationship to the holes 26. A fabric roll 66 of the prepreg layer 40 can be applied via roller onto the adhesive layer 30. A needle 70 (e.g., of a sewing machine) can be utilized for stitching the composite panels together using thread 58 to form the composite structure 50, such as disclosed herein. An additional roller 68 may apply pressure to the adhesive layer 30 and prepreg layer 40 to compress the respective layers into the composite panels 10 before stitching together the components 10, 30, 40 (e.g., by the sewing machine). Additionally or alternatively, one or more of the joining operations may be performed manually by hand (not shown). The composite panels 10 move in the direction indicated generally by arrow A in FIG. 8 along the multi-headed tool 60 in order to perform each manufacturing step in succession.

If stiffeners 42 are provided in the prepreg layer 40, their shape will dictate the type of tool head or roller 66 needed for their accurate placement. If desired, the stitching needle 70 or a separate needle on the multi-headed tool 60 may inject the adhesive layer 30 into the holes 26 in the composite panel 10 during and/or after stitching the composite panels together with the thread 58. The multi-headed tool 60 may further include precision guide rails (not shown) that allow the tool to move via stepper motors along or transverse to the axis 20 of each composite panel 10 in order to perform all the joining operations.

Embodiments of the bonded and stitched composite structure 50 are advantageous in that the fastening joints provide redundancy to the connection between composite panels 10. For example, the mechanical joint, including the thread 58 stitching, acts as a safeguard to ensure that a connection between composite panels 10 is maintained, thereby enhancing the reliability and damage tolerance of bonded composite panels in case a chemical bond of the adhesive layer 30 weakens or fails. Such a redundant fastening stitching technique allows for the utilization of stitching for joining large cured composite panels without the labor and mass expense of using bolted joints. Additionally, the combined adhesive layer 30 and thread 58 (via pretensioning) can perform load sharing at the joint to further augment the strength of the joint. The systems and methods disclosed herein further allow for the joining of assemblies that cannot be cured in their entirety and therefore is beneficial in manufacturing large composite structures 50, such as panels of vehicles. The systems and methods disclosed herein also allows for stitching of various panel configurations, e.g., sandwich panels and stiffened panels, and the multi-headed tool 60 increases the flexibility of the joints that can be manufactured.

Example embodiments of the invention have been illustrated and described in detail. However, the present invention is not to be considered limited to the precise construction disclosed. For instance, although the systems and methods have been illustrated and described as being used to redundantly secure composite panels 10 together to form the composite structure 50, it will be understood that any hard structures can be joined together via either other hard structures or to soft structures such as prepreg layers 40.

Figure 9:
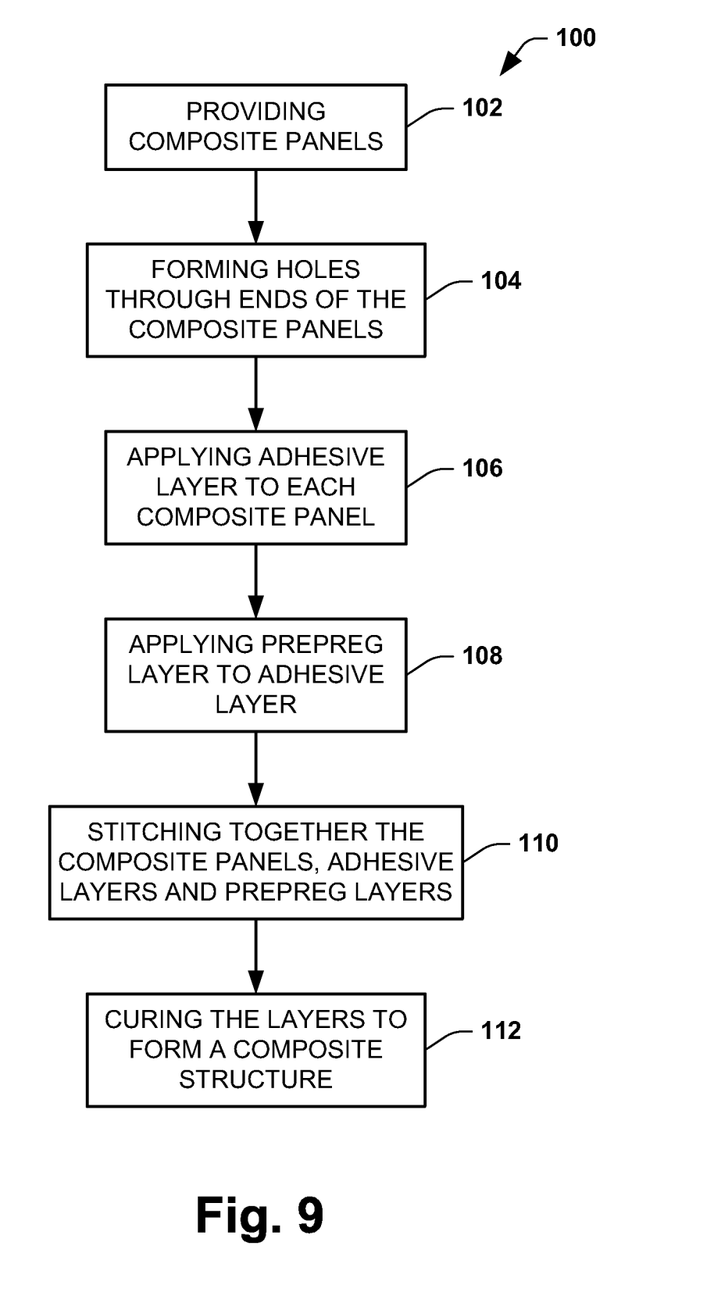
FIG. 9 is a flow diagram illustrating an example of method that can be used to make a composite structure.

In view of the foregoing structural and functional features described above, an example method will be better appreciated with reference to FIG. 9. While, for purposes of simplicity of explanation, the method is shown and described as executing serially, it is to be understood and appreciated that such method is not limited by the illustrated order, as parts of the method could occur in different orders and/or concurrently from that shown and described herein.

FIG. 9 is a flow diagram of a method 100 that can be employed to form a composite structure (e.g., the composite structure 50 of FIG. 1 or 7). The method begins at 102 in which a plurality of two or more composite panels (e.g., panels 10 disclosed with respect to FIGS. 1-7) are provided. Each composite panel includes a plurality of holes that are formed through one or more end thereof, indicated at 104.

At 106, the method includes applying an adhesive layer (e.g., adhesive layer 30 of FIGS. 1, 2, 5 and 7) to each composite panel. For example, the adhesive layer can be applied (e.g., as one or more sheets from a roll or mechanically sprayed) to one or more surface of each composite panel in overlying relationship to the holes. The adhesive can be uncured when it is applied to the composite panels and subsequently cured as disclosed herein. At 108, a prepreg layer is applied to each adhesive layer. The prepreg layer can be applied uncured and later cured as disclosed herein.

At 110, the method includes stitching the composite panels, adhesive layers, and prepreg layers together. The stitching can include passing a length of one or more flexible connecting elements (e.g., one or more threads 58 of FIGS. 1, 6 and 7) through the adhesive and prepreg layers and into the plurality of holes in the composite panels of material, such as by a sewing machine. The stitching at 110 can also include pretensioning the stitches by applying a predetermined force (e.g., via a sewing machine) as the stitches are applied. Thus, in addition to the stitching providing a redundant support to the adhesive the pretension can afford increase load sharing between the adhesive layer and the stitches.

At 112, the method includes curing at least the adhesive layer to bond the composite panels together to form the composite structure. In some examples, as disclosed herein, the prepreg layer and/or connecting element can also be cured at 112 to enhance the bonds formed in the composite structure. The curing methods can be the same or different depending on the materials used for each of the layers and stitching.

As disclosed herein, the resulting composite structure produced according to the method 100 allows for increased damage tolerance and redundancy of a composite joint and provides a highly efficient approach to join two cured adjacent panels. The construction and methods disclosed herein are applicable to large panels, such as with joint lengths greater than 10 feet (e.g., greater than 15 feet). In other example, however, the process and structure can also be utilized for smaller joint lengths (e.g., inches long) especially for circumstances where panels will carry out planar loading.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A method for forming a composite structure comprising:
   providing a plurality of composite panels of material, each composite panel having a plurality of holes formed therethrough;

applying an uncured adhesive layer to each of the composite panels;

applying an adjoining layer over each adhesive layer and over a joint between ends of the composite panels;

stitching the composite panels, the adhesive layer, and the adjoining layer together by passing a length of a flexible connecting element into the plurality of holes in the composite panels; and curing at least the adhesive layer to bond the composite panels together and thereby form the composite structure.

2. The method of claim 1, wherein the adhesive layer is applied to a surface of each of the composite panels in overlying relationship with the holes of each of the respective composite panels.

3. The method of claim 2, wherein the holes are formed through an end portion of each of the respective composite panels that is to be joined together.

4. The method of claim 3, wherein the end portion of each of the respective composite panels has a curved end, the curved end of each of the respective composite panels being aligned and urged together for the application of the adhesive layer.

5. The method of claim 1, wherein at least one of the composite panels comprises a pair of facesheets with a core that includes stiffeners extending between the pair of facesheets.

6. The method of claim 1, wherein at least one of the composite panels comprises a fiber reinforced foam core between a pair of facesheets that provide respective outer surfaces of the at least one of the composite panels.

7. The method of claim 1, wherein the adhesive layer is applied onto the composite panels via one of a roller or spray mechanism.

8. The method of claim 1, wherein the stitching further comprises applying a predetermined amount of tension to the flexible connecting element being stitched to facilitate load sharing between the flexible connecting element and the adhesive layer.

9. The method of claim 1, wherein the adhesive layer, the adjoining layer and the stitching comprises corresponding components applied at each opposing side surface of the composite panels that are being joined together, such that the composite panels and each of the adhesive layers are sandwiched together between adjoining layers applied over the opposing side surfaces.

10. The method of claim 1, wherein the curing is applied to cure the adhesive layer and at least one more of the adjoining layer and the flexible connecting element to bond the composite panels together to form the composite structure.

11. The method of claim 1, wherein the adjoining layer comprises a prepreg layer.

12. The method of claim 11, further comprising applying pressure to compress the adhesive layer and the prepreg layer into the composite panels before the stitching together is performed.

13. The composite structure produced according to the method of claim 1.

14. A composite structure comprising:

a pair of composite panels of material, each of the composite panels having a plurality of holes extending therethrough adjacent at least one end portion thereof, the end portion of each of the composite panels being positioned adjacent to each other to define a joint therebetween;

a layer of adhesive material disposed on a surface of each of the composite panels overlying the holes;

an adjoining layer disposed over the layer of adhesive material on each of the composite panels, the layer of adhesive material being cured to bond the composite panels of material together, and a length of a flexible connecting element extending through the adjoining layer and the layer of adhesive material and into the holes of the composite panels to stitch the pair of composite panels a together to provide the composite structure with a redundant connection at the joint.

15. The composite structure of claim 14, wherein each of the composite panels comprises a substantially flat panel that are arranged substantially coplanar with respect to each other at respective adjacent ends thereof to provide the joint.

16. The composite structure of claim 14, wherein the layer of adhesive material comprises at least one layer of adhesive material applied to the surface of each of the composite panels in an overlying relationship to the holes formed through each of the respective composite panels.

17. The composite structure of claim 16, wherein at least one of the composite panels comprises a pair of facesheets with a core disposed between the pair of facesheets, at least one of the facesheets of the at least one composite panel defining an outer surface to which the layer of adhesive material is applied.

18. The composite structure of claim 17, wherein the core comprises one of a fiber reinforced foam core or a plurality of stiffeners extending between the pair of facesheets.

19. The composite structure of claim 16, wherein the layer of adhesive material further comprises first and second layers of the adhesive material at opposing surfaces of each of the composite panels located in overlying relationship with the holes, and wherein the adjoining layer comprises first and second adjoining layers applied over each of the first and second layers of the adhesive material and the joint.

20. The composite structure of claim 14, wherein each respective composite panel has a substantially planar surface, at least near the joint, each respective planar surface being maintained in co-planar arrangement by the layer of adhesive material, the adjoining layer and the flexible connecting element.

21. The composite structure of claim 14, wherein the end portion of each respective composite panel is curved end about an axis, the curved end of each respective composite panel being aligned substantially coaxially along the axis.

22. The composite structure of claim 14, wherein the adjoining layer comprises one of a prepreg layer or a cured hard plate.

* * * * *